United States Patent
Haehre et al.

(10) Patent No.: US 12,019,888 B2
(45) Date of Patent: Jun. 25, 2024

(54) DEFERRED ZONE ADJUSTMENT IN ZONE MEMORY SYSTEM

(71) Applicant: Micron Technology, Inc., Boise, ID (US)

(72) Inventors: Oyvind Haehre, Loveland, CO (US); Nathaniel Wessel, Longmont, CO (US); Byron Harris, Mead, CO (US)

(73) Assignee: Micron Technology, Inc., Boise, ID (US)

( * ) Notice: Subject to any disclaimer, the term of this patent is extended or adjusted under 35 U.S.C. 154(b) by 16 days.

(21) Appl. No.: 17/899,801

(22) Filed: Aug. 31, 2022

(65) Prior Publication Data

US 2024/0069774 A1 Feb. 29, 2024

(51) Int. Cl.
*G06F 12/00* (2006.01)
*G06F 3/06* (2006.01)

(52) U.S. Cl.
CPC ............ *G06F 3/064* (2013.01); *G06F 3/0619* (2013.01); *G06F 3/0679* (2013.01)

(58) Field of Classification Search
None
See application file for complete search history.

(56) References Cited

U.S. PATENT DOCUMENTS

| 2021/0073038 A1* | 3/2021 | Jones | G06F 3/0679 |
| 2022/0057938 A1* | 2/2022 | Park | G06F 3/0644 |
| 2022/0138099 A1* | 5/2022 | Kang | G06F 12/0246 711/154 |

\* cited by examiner

*Primary Examiner* — Daniel D Tsui
(74) *Attorney, Agent, or Firm* — Schwegman Lundberg & Woessner, P.A.

(57) ABSTRACT

Various embodiments provide for deferring adjustment of a zone in a memory system or sub-system that supports zones. In particular, some embodiments provide for deferred adjustment of a zone based on detection of an error in a block of an unassigned block set, which can be tracked using a counter.

20 Claims, 7 Drawing Sheets

DEFERRED ZONE ADJUSTMENT IN ZONE MEMORY SYSTEM

TECHNICAL FIELD

Embodiments of the disclosure relate generally to memory devices and, more specifically, to deferring adjustment of a zone in a memory system or sub-system that supports zones.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
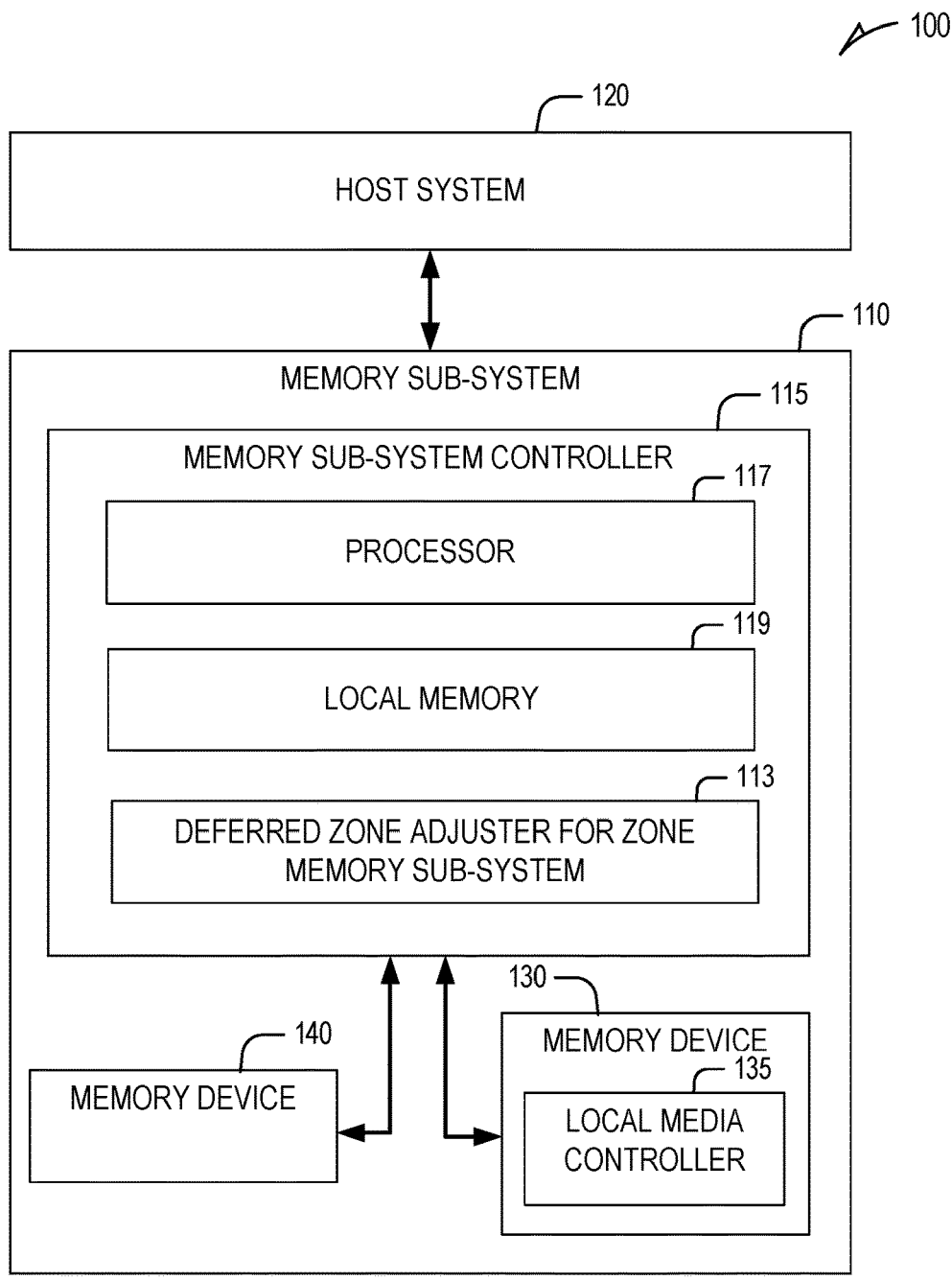
FIG. 1 is a block diagram illustrating an example computing system that includes a memory sub-system, in accordance with some embodiments of the present disclosure.

Aspects of the present disclosure are directed to deferring adjustment of a zone in a memory system or sub-system that supports zones (hereafter, a zone memory sub-system). In particular, some embodiments provide for deferred adjustment (e.g., offlining) of a zone based on detection of an error in a block of an unassigned block set, which can be tracked using a counter. As used herein, a set of blocks (or block set) can comprise one or more blocks of a memory device, and an unassigned (or unbounded) block set can be one that is not currently assigned to a zone of a memory system or sub-system.

A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can send access requests to the memory sub-system, such as to store data at the memory sub-system and to read data from the memory sub-system.

The host system can send access requests (e.g., write command, read command) to the memory sub-system, such as to store data on a memory device at the memory sub-system, read data from the memory device on the memory sub-system, or write/read constructs (e.g., such as submission and completion queues) with respect to a memory device on the memory sub-system. The data to be read or written, as specified by a host request, is hereinafter referred to as "host data" or "user data."

The data can be stored in the memory sub-system according to zones (e.g. a zoned name space (ZNS)). Such a memory sub-system can be referred to as a zone-based memory sub-system or a zone memory sub-system. Various zones can be defined in the memory sub-system, each of which can be uniquely associated with a particular set of user data or an application. For example, a first zone can be associated with a first application (or user data identified as received from the first application) and a second zone can be associated with a second application. Host data or user data received from the first application can be stored by the memory sub-system in the first zone. The zones can be of equal or unequal size and can span the size of a single block on a die, multiple blocks on the die, an entire die or a set of dies of the memory sub-system. For example, each zone can span a respective set of blocks (or block set) in a corresponding die or set of dies rather than sequentially across a row of blocks, and a particular application can be associated with a given zone that spans a single die. User or host data associated with that application can be stored in that given zone on the single die. A zone can be defined in a memory sub-system in accordance with a NVM Express (NVMe) specification. For instance, a zone can be defined in a memory sub-system by one or more NVMe commands issued to the memory sub-system. As used herein, a zone can be activated, reset, or offlined. A zone once activated (e.g., by a zone activation operation) can be one assigned (e.g., bound or allocated) to one or more blocks (e.g., assigned to a block set), which can be specified at the time of activation. A zone once activated can be rendered accessible for storing data (e.g., reading data from or writing data to the zone). A zone once reset (e.g., by a zone reset operation) can unassign (e.g., unbind, unallocate, release) one or more blocks (e.g., the block set) that are currently assigned to the zone and can mark those one or more blocks for erasure. A zone that is reset can be deleted from the host system perspective. A zone once offlined is disabled from subsequent use (e.g., deleted from the host system's perspective and unavailable for subsequent activation).

A host request can include logical address information (e.g., logical block address (LBA), namespace) for the host data, which is the location the host system associates with the host data and a particular zone in which to store or access the host data. The logical address information (e.g., LBA, namespace) can be part of metadata for the host data. Metadata can also include error handling data (e.g., error-correcting code (ECC) code word, parity code), data version (e.g., used to distinguish age of data written), valid bitmap (which LBAs or logical transfer units contain valid data), and so forth.

The memory sub-system can initiate media management operations, such as a write operation, on host data that is stored on a memory device. For example, firmware of the memory sub-system may re-write previously written host data from a location of a memory device to a new location as part of garbage collection management operations. The data that is re-written, for example as initiated by the firmware, is hereinafter referred to as "garbage collection data."

"User data" hereinafter generally refers to host data and garbage collection data. "System data" hereinafter refers to data that is created and/or maintained by the memory sub-system for performing operations in response to host requests and for media management. Examples of system data include, and are not limited to, system tables (e.g., logical-to-physical memory address mapping table (also referred to herein as a L2P table), data from logging, scratch pad data, and so forth).

A memory device can be a non-volatile memory device. A non-volatile memory device is a package of one or more die. Each die can be comprised of one or more planes. For some types of non-volatile memory devices (e.g., AND-type devices), each plane is comprised of a set of physical blocks. For some memory devices, blocks are the smallest area that can be erased. Each block is comprised of a set of pages. Each page is comprised of a set of memory cells, which store bits of data. The memory devices can be raw memory devices (e.g., NAND), which are managed externally, for example, by an external controller. The memory devices can be managed memory devices (e.g., managed NAND), which are a raw memory device combined with a local embedded controller for memory management within the same memory device package. The memory device can be divided into one or more zones where each zone is associated with a different set of host data or user data or application.

Certain memory devices, such as NAND-type memory devices, comprise one or more blocks, (e.g., multiple blocks), with each of those blocks comprising multiple memory cells. For instance, a memory device can comprise multiple pages (also referred as wordlines), with each page comprising a subset of memory cells of the memory device. A threshold voltage (VT) of a memory cell (of a block) can be the voltage at which the floating gate (e.g., NAND transistor), implementing the memory cell, turns on and conducts (e.g., to a bit line coupled to the memory cell). Generally, writing data to such memory devices involves programming (by way of a program operation) the memory devices at the page level of a block, and erasing data from such memory devices involves erasing the memory devices at the block level (e.g., page level erasure of data is not possible).

A memory device can comprise one or more blocks. A block can comprise a single-level cell (SLC) block that comprises multiple SLCs, a multiple-layer cell (MLC) block that comprises multiple MLCs, a triple-level cell (TLC) block that comprises multiple TLCs, or a quad-level cell (QLC) block that comprises QLCs.

Generally, a memory sub-system performs can detect whether a block has an error when an operation, such as a write, read, or erase operation, is performed on the block. The error detected for a block can include a block erase failure, a block program failure, or a block read-verify failure. An errored block is usually marked and/or otherwise retired from subsequent use. In conventional zone memory sub-systems, when one or more blocks of a block set (e.g., SLC, MLC, TLC, QLC block set) are detected to have an error, one or more zones of the zone memory sub-system are offlined to reflect a reduction in storage capacity of the zone memory sub-system based on the errored blocks. If an error is detected with respect to one or more blocks of an unassigned (e.g., unbounded) block set, a memory sub-system selects an arbitrary zone to be offlined. Typically, the arbitrary zone selected is in an empty state (e.g., not storing valid data) so that user data is not lost or otherwise compromised. Additionally, the states of zones of the memory sub-system are stored in a table, such as a Zone Management Table (ZMT) (e.g., 1.2 million entries on a memory device having 1.2 million zones). Conventional zone memory systems can search the table of zones for an empty zone to offline as part of an error handling mechanism (e.g., a mechanism that detects an errored block and requests that the errored block be retired). Unfortunately, where the zones of the memory sub-system are near or completely full of data (e.g., user data), there will be very few or no zones in an empty state. Further, the speed at which the table can be searched for empty zones for offlining can be limited due to its size and the type of memory used to store the table (e.g., generally stored on a large capacity memory device, such as dynamic random access memory (DRAM), which typically operates slower than other types of memory).

Various embodiments described herein provide for deferring adjustment of a zone in a zone memory sub-system, where the adjustment can include offlining the zone. According to some embodiments, a counter is used to implement deferred zone adjustment. For example, in response to detecting that one or more blocks are errored, the counter can be adjusted (e.g., incremented) to indicate that one or more zones are pending adjustment (e.g., offlining or reduction in capacity) at a designated time in the future, such as when a host system sends (e.g., to the zone memory sub-system) a request to activate or reset a zone. In this way, the appropriate time can represent a deferred time, and the counter can be used to determine (e.g., track) when an adjustment to one or more zones has been deferred for the appropriate time. For some embodiments, a memory sub-system detects an error with respect to one or more blocks of a block set (e.g., a QLC block set) unassigned (e.g., unbounded) to a zone, and sets a pending offline indication, such as via a counter (e.g., a pending zone offline counter). For example, an error handler of the memory sub-system can detect the error and can send a request to retire the one or more blocks. Subsequently, in response to receiving a zone activation request or zone reset request from a host system, the memory sub-system of some embodiments checks for a pending offline indication (e.g., the pending zone offline counter) and, if the check determines that the pending offline indication is present, the memory sub-system fails the request and transitions the zone specified by the request to be adjusted or offlined instead of processing the request (e.g., the zone activation request or the zone reset request).

Use of various embodiments described herein can reduce or obviate the need to search a table of zones (e.g., ZMT) to determine (e.g., identify) an empty zone upon which to perform an offline operation, such as in response to detecting an errored block in a block set. Use of some embodiments described herein can reduce or obviate the need for special handling of a memory sub-system when storage is nearly full. Additionally, use of some embodiments described herein can avoid potential coherency issues faced by conventional zone memory sub-systems.

As used herein, a physical memory location of a memory die can comprise a block, a page, or a memory cell. For instance, where a physical memory location comprises a page or a memory cell, a set of physical memory locations can represent a single block or multiple blocks. The set of physical memory locations can be a set of contiguous physical memory locations. As used herein, storing data on one or more physical memory locations of a memory die can comprise writing data to the one or more physical memory locations, where the writing can comprise programming one or more pages of a block with the data.

Disclosed herein are some examples of deferring adjustment of a zone in a memory system or sub-system that supports zones, as described herein.

FIG. 1 illustrates an example computing system 100 that includes a memory sub-system 110, in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, a secure digital (SD) card, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-systems 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., NVDIMM controller), and a storage protocol controller (e.g., a peripheral component interconnect express (PCIe) controller, serial advanced technology attachment (SATA) controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a SATA interface, a peripheral component interconnect express (PCIe) interface, USB interface, Fibre Channel, Serial Attached SCSI (SAS), Small Computer System Interface (SCSI), a double data rate (DDR) memory bus, a DIMM interface (e.g., DIMM socket interface that supports DDR), Open NAND Flash Interface (ONFI), DDR, Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a NAND type flash memory and write-in-place memory, such as a three-dimensional (3D) cross-point memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional (2D) NAND and 3D NAND.

Each of the memory devices 130 can include one or more arrays of memory cells. One type of memory cell, for example, SLCs, can store one bit per cell. Other types of memory cells, such as MLCs, TLCs, QLCs, and penta-level cells (PLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks. As used herein, a block comprising SLCs can be referred to as a SLC block, a block comprising MLCs can be referred to as a MLC block, a block comprising TLCs can be referred to as a TLC block, and a block comprising QLCs can be referred to as a QLC block.

Although non-volatile memory components such as NAND type flash memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide-based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide-based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, and so forth. The local memory 119 can also include ROM for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130 and/or the memory device 140. The memory sub-system controller 115 can be responsible for other operations such as wear leveling operations, garbage collection operations, error detection and ECC operations, encryption operations, caching operations, and address translations between a logical address (e.g., LBA, namespace) and a physical memory address (e.g., physical block address) that are associated with the memory devices 130. The memory sub-system controller 115 can further include host interface circuitry to communicate with the host system 120 via the physical host interface. The host interface circuitry can convert the commands received from the host system 120 into command instructions to access the memory devices 130 and/or the memory device 140 as well as convert responses associated with the memory devices 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local media controller 135) for media management within the same memory device package. An example of a managed memory device is a managed NAND (MNAND) device.

The memory sub-system controller 115 includes a deferred zone adjuster for zone memory sub-system 113 (hereafter, the deferred zone adjuster 113) that enables or facilitates the memory sub-system controller 115 to implement deferred adjustment for zones of the memory sub-system 110 in accordance with various embodiments described herein. Alternatively, some or all of the deferred zone adjuster 113 is included by the local media controller 135, thereby enabling the local media controller 135 to enable or facilitate deferred adjustment of a zone of the memory sub-system 110. According to some embodiments, each zone defined on the memory sub-system 110 can be assigned to one or more blocks (e.g., a block set) of the memory devices 130, 140.

According to some embodiments, the deferred zone adjuster 113 causes the memory sub-system controller 115 to detect an error with respect to one or more blocks of an unassigned (e.g., unbounded) block set. Depending on the embodiment, the error can be one of a write error, a read error, and an erase error detected with respect to the one or more block. In response to detecting an error with respect to one or more blocks of an unassigned block set, the deferred zone adjuster 113 can cause the memory sub-system controller 115 to adjust the pending zone offline counter to indicate that there is one more (e.g., an additional) zone pending a zone offline operation.

For example, adjusting the pending zone offline counter to indicate that there is one more zone pending a zone offline operation comprises incrementing the pending zone offline counter (e.g., by a value of one). By adjusting the pending zone offline counter, a zone offline operation can be deferred for a designated time in the future and a search of a table of zones based on states (e.g., to find an empty zone) can be avoided. Eventually, the memory sub-system controller 115 can receive, from the host system 120, a request for a specified zone, where the request comprises one of a zone activation request or a zone reset request. In response to receiving the request, the deferred zone adjuster 113 can cause the memory sub-system controller 115 to determine, based on the pending zone offline counter, whether there is at least one zone pending a zone offline operation.

For instance, for some embodiments, the pending zone offline counter indicates that there is at least one zone pending a zone offline operation when the pending zone offline counter has a non-zero value (e.g., the pending zone offline counter is greater than the value of zero). In response to receiving the request and determining that the pending zone offline counter does not indicate that there is at least one zone pending the zone offline operation, the deferred zone adjuster 113 can cause the memory sub-system controller 115 to performing the request from the host system 120 on the specified zone. However, in response to the pending zone offline counter indicating that there is at least one zone pending a zone offline operation, the deferred zone adjuster 113 can cause the memory sub-system controller 115 to perform a zone offline operation on the specified zone. In doing so, a deferred offlining operation can be performed on at least one zone pending offlining.

Additionally, in response to the pending zone offline counter indicating that there is at least one zone pending a zone offline operation, the deferred zone adjuster 113 can cause the memory sub-system controller 115 to adjust the pending zone offline counter to indicate that there is one less zone pending a zone offline operation. For example, adjusting the pending zone offline counter to indicate that there is one less zone pending a zone offline operation comprises decrementing the pending zone offline counter (e.g., by a value of one). Further, in response to the pending zone offline counter indicating that there is at least one zone pending a zone offline operation, the deferred zone adjuster 113 can cause the memory sub-system controller 115 to send a notification to the host system 120 that the request (e.g., received from the host system 120) failed to be performed.

According to some alternative embodiments, the deferred zone adjuster 113 causes the memory sub-system controller 115 to detect an error with respect to one or more blocks of an unassigned (e.g., unbounded) block set. In response to detecting an error with respect to one or more blocks of an unassigned block set, the deferred zone adjuster 113 can cause the memory sub-system controller 115 to adjust the errored block counter to reflect the number of errored blocks that were detected in the unassigned block set.

For example, adjusting the errored block counter to indicate the number of errored blocks detected in the unassigned block set comprises incrementing the errored block counter by the number of errored blocks that were detected in the unassigned block set. By adjusting the errored block counter, a zone adjustment operation can be deferred for a designated time in the future and a search of a table of zones based on states (e.g., to find an empty zone) can be avoided. Eventually, the memory sub-system controller 115 can receive, from the host system 120, a request for a specified zone, where the request comprises one of a zone activation request or a zone reset request. In response to receiving the request, the deferred zone adjuster 113 can cause the memory sub-system controller 115 to determine, based on the errored block counter, whether at least one zone is pending adjustment (or offlining).

For instance, for some embodiments, the errored block counter indicates that there is at least one zone pending adjustment when the errored block counter has a non-zero value (e.g., the errored block counter is greater than the value of zero). In response to receiving the request and determining that the errored block counter does not indicate that there is at least one zone pending adjustment, the deferred zone adjuster 113 can cause the memory sub-system controller 115 to performing the request from the host system 120 on the specified zone. However, in response to the errored block counter indicating that there is at least one zone pending adjustment, the deferred zone adjuster 113 can cause the memory sub-system controller 115 to adjust the specified zone based on the errored block counter. For instance, adjusting the specified zone based on the errored block counter can comprise performing a zone offline operation on the specified zone in response to the errored block counter having a value that is larger than or equal to the number of blocks of (e.g., assigned to) the specified zone. Accordingly, if the errored block counter indicates five blocks and the specific zone is assigned to a block set comprising four blocks, a zone offline operation can be performed on the specified zone to offline the specified zone.

In another example, adjusting the specified zone based on the errored block counter can comprise reducing a capacity (e.g., size) of the specified zone based on the errored block counter in response to the errored block counter being less than the number of blocks of the specified zone. Accordingly, if the errored block counter indicates three blocks and the specific zone is assigned to a block set comprising four blocks, the capacity of the specified zone can be reduced to one block (e.g., instead of the specified zone being offlined) to reflect the reduction in blocks available for assignment to zones. Additionally, in response to the errored block counter indicating that there is at least one zone pending adjustment, the deferred zone adjuster 113 can cause the memory sub-system controller 115 to adjust the errored block counter based on the adjusting of the specified zone. For instance, adjusting the errored block counter based on the adjusting of the specified zone comprises adjusting the errored block counter based on the number of blocks of the specified zone, thereby reflecting that one zone has been adjusted.

Where the number of blocks of the specified zone is greater than the errored block counter, the errored block counter would be reset (e.g., to a value of zero), given that the capacity reduction of the specified zone covers all errored blocks that remain for consideration. Further, in response to the errored block counter indicating that there is at least one zone pending adjustment, the deferred zone adjuster 113 can cause the memory sub-system controller 115 to send a notification to the host system 120 that the request (e.g., received from the host system 120) failed to be performed.

FIGS. 2 through 5 are flow diagrams of example methods for deferring adjustment of a zone in a memory sub-system that supports zones, in accordance with some embodiments of the present disclosure. In particular, the methods 200, 300 of FIGS. 2 and 3 relate to various embodiments where errored blocks detected in block sets results in offlining of zones, while the methods 400, 500 of FIGS. 4 and 5 relate to various embodiments where errored blocks detected in block sets results in capacity reduction or offlining of zones. Any of the methods 200, 300, 400, 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, one or more of the methods 200, 300, 400, 500 are performed by the memory sub-system controller 115 of FIG. 1 based on the deferred zone adjuster 113. Additionally, or alternatively, for some embodiments, one or more of the methods 200, 300, 400, 500 are performed, at least in part, by the local media controller 135 of the memory device 130 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are used in every embodiment. Other process flows are possible.

Figure 2:
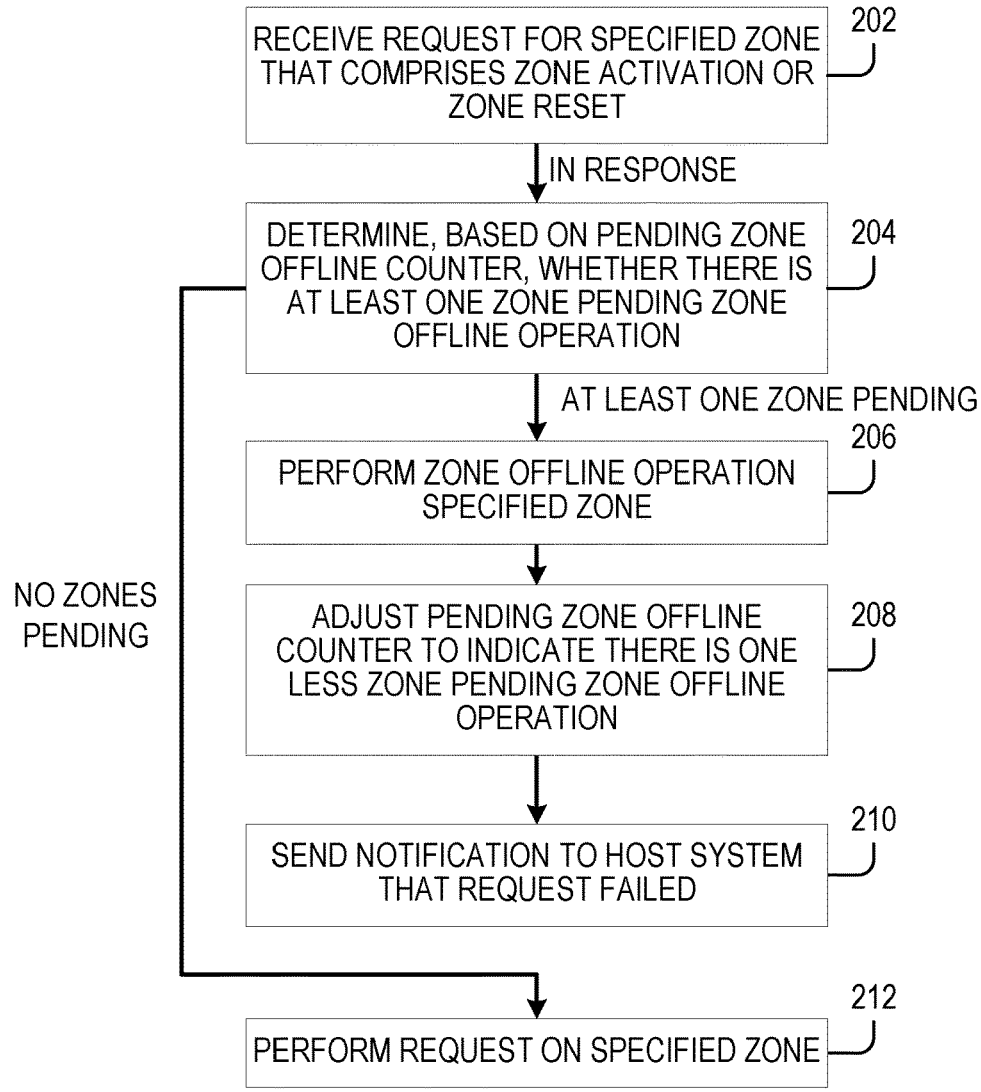
FIGS. 2 through 5 are flow diagrams of example methods for deferring adjustment of a zone in a memory sub-system that supports zones, in accordance with some embodiments of the present disclosure.

Referring now to the method 200 of FIG. 2, the method 200 illustrates an example method for offlining a zone based on a counter (e.g., a pending zone offline counter). For some embodiments, a zone manager operating on the memory sub-system 110 can perform one or more of operations of the method 200.

At operation 202, a processing device (e.g., the processor 117 of the memory sub-system controller 115) receives, from a host system (e.g., 120), a request for a specified zone, where the request comprises one of a zone activation request or a zone reset request. For some embodiments, the request comprises a zone command in accordance with a NVME ZNS Command Set Specification. Additionally, for some embodiments, such a request can be received by a zone manager, such as a zone and block set manager, operating on the memory sub-system 110. In response to the request received by operation 202, the processing device (e.g., 117) at operation 204 determines, based on a pending zone offline counter, whether there is at least one zone pending a zone offline operation.

In response to the processing device (e.g., 117) determining at operation 204 that the pending zone offline counter does not indicate that there is at least one zone pending the zone offline operation, at operation 212 the processing device performs the request (e.g., the zone activation or the zone reset request) on the specified zone. However, in response to the processing device (e.g., 117) determining at operation 204 that the pending zone offline counter does indicate that there is at least one zone pending the zone offline operation, at operation 206 the processing device performs a zone offline operation on the specified zone, which sets the state of the specified zone (e.g., from active) to offline. Additionally, at operation 208 the processing device (e.g., 117) adjusts the pending zone offline counter to indicate that there is one less zone pending the zone offline operation. For instance, at operation 208 the processing device (e.g., 117) can decrement the pending zone offline counter by a value of one to adjust the pending zone offline counter to indicate that there is one less zone pending the zone offline operation. In alternative embodiments (e.g., where a negative value of the pending zone offline counter indicates that there is at least one zone pending offlining), the processing device (e.g., 117) can increment the pending zone offline counter at operation 208 by a value of one to adjust the pending zone offline counter to indicate that there is one less zone pending the zone offline operation.

At operation 210, the processing device (e.g., 117) sends a notification to the host system that the request failed. For example, the notification can comprise a notification that indicates that the specified zone (of the request) is offline. Some embodiments use a NVME ZNS Command Set Specification that permits for host command completion to indicate that a requested zone is offline. Additionally, the zone offlining could be from processing of the host request.

Figure 3:
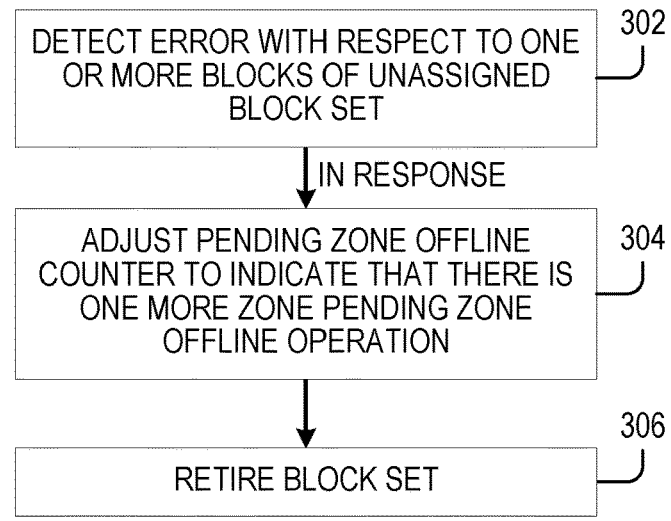

Referring now to the method 300 of FIG. 3, the method 300 illustrates an example method for updating a counter (e.g., a pending zone offline counter) based on detecting one or more errored blocks in a block set. For some embodiments, a zone manager operating on the memory sub-system 110 can perform one or more of operations of the method 300.

At operation 302, the processing device (e.g., 117) detects an error with respect to one or more blocks of an unassigned block set. Examples of errors detected can include, without limitation, a write error, a read error, and an erase error. For some embodiments, operation 302 comprises the processing device (e.g., 117) detecting that a request has been received from an error handler (e.g., of the memory sub-system 110) to retire one or more blocks or a block set, and the processing device determining that the one or more blocks or the block set specified by the request are currently unassigned (e.g., unbounded). Such a request can be received by a zone manager, such as a zone and block set manager, operating on the memory sub-system 110.

In response to detecting the error with respect to the one or more blocks of the unassigned block set, at operation 304 the processing device (e.g., 117) adjusts a pending zone offline counter to indicate that there is one more zone pending the zone offline operation. For instance, at operation 304 the processing device (e.g., 117) can increment the pending zone offline counter by a value of one to adjust the pending zone offline counter to indicate that there is one more zone pending the zone offline operation. In alternative embodiments (e.g., where a negative value of the pending zone offline counter indicates that there is at least one zone pending offlining), at operation 304 the processing device (e.g., 117) can decrement the pending zone offline counter by a value of one to adjust the pending zone offline counter to indicate that there is one more zone pending the zone offline operation. During operation 306, the processing device (e.g., 117) retires the block set in which the one or more errored blocks were detected.

Figure 4:
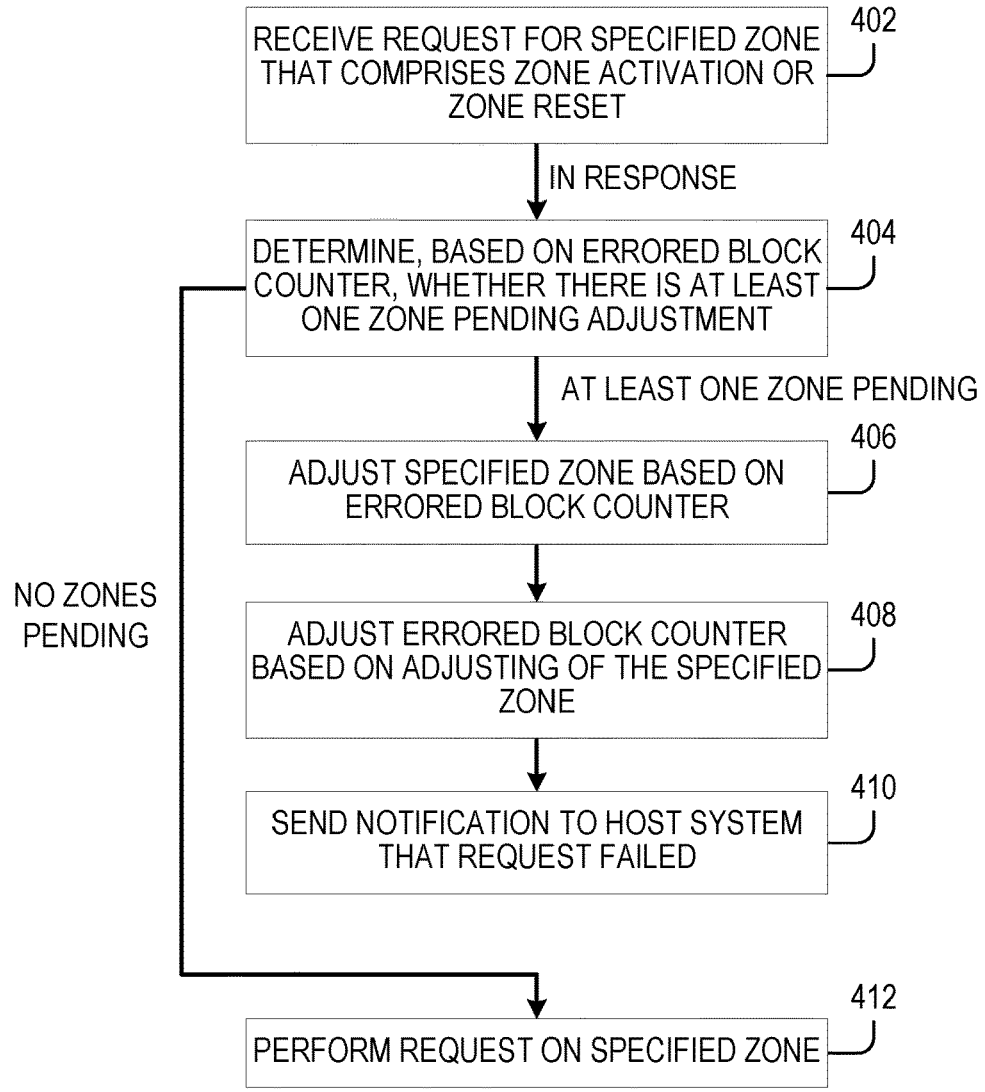

Referring now to the method 400 of FIG. 4, the method 400 illustrates an example method for reducing a capacity of a zone or offlining the zone based on a counter (e.g., an errored block counter). For some embodiments, a zone manager operating on the memory sub-system 110 can perform one or more of operations of the method 400.

At operation 402, a processing device (e.g., the processor 117 of the memory sub-system controller 115) receives, from a host system (e.g., 120), a request for a specified zone, where the request comprises one of a zone activation request or a zone reset request. For some embodiments, the request comprises a zone command in accordance with a NVME ZNS Command Set Specification. Additionally, for some embodiments, such a request can be received by a zone manager, such as a zone and block set manager, operating on the memory sub-system 110. In response to the request received by operation 402, the processing device (e.g., 117) at operation 404 determines, based on an errored block counter, whether there is at least one zone pending adjustment. For some embodiments, the adjustment to a zone can comprise a reduction in capacity (e.g., size) of the zone or offlining of the zone.

In response to the processing device (e.g., 117) determining at operation 404 that the errored block counter does not indicate that there is at least one zone pending adjustment, at operation 412 the processing device performs the request (e.g., the zone activation or the zone reset request) on the specified zone. However, in response to the processing device (e.g., 117) determining at operation 404 that the errored block counter does indicate that there is at least one zone pending adjustment, at operation 406 the processing device adjusts the specified zone based on the errored block counter. Additionally, at operation 408 the processing device (e.g., 117) adjusts the errored block counter based on the adjusting of the specified zone.

For some embodiments, adjusting the specified zone based on the errored block counter comprises performing a zone offline operation on the specified zone in response to the errored block counter having a value that is larger than or equal to the number of blocks of the specified zone. In such instances, the errored block counter having a value that is larger than or equal to the number of blocks of the specified zone is an indication that there is a sufficient number of errored blocks detected (e.g., by the method 500 of FIG. 5) to reduce the capacity of the specified zone to zero, so the specified block should be offlined. Additionally, when the errored block counter has a value that is larger than or equal to the number of blocks of the specified zone (and the specified zone is offlined as a result), at operation 408 the processing device (e.g., 117) can adjust the errored block counter based on the adjusting of the specified zone by decreasing the errored block counter by the number of blocks of the specified zone, since the offlining of the specified zone does not address all remaining errored blocks that still needed to be accounted for.

For some embodiments, adjusting the errored block counter based on the adjusting of the specified zone comprises reducing a capacity (e.g., size) of the specified zone based on the errored block counter in response to the errored block counter having a value that is less than the number of blocks of the specified zone. In such instances, the errored block counter having a value that is less than the number of blocks of the specified zone is an indication that there is an insufficient number of errored blocks detected (e.g., by the method 500 of FIG. 5) to offline the capacity of the specified zone to zero, so the capacity of the specified block should be reduced instead. Additionally, when the errored block counter has a value that is less than the number of blocks of the specified zone (and the capacity of the specified zone has been reduced accordingly), at operation 408 the processing device (e.g., 117) can adjust the errored block counter based on the adjusting of the specified zone by resetting the errored block counter (e.g., to a zero value), since the reduction in capacity of the specified zone addresses all remaining errored blocks that still needed to be accounted for.

At operation 410, the processing device (e.g., 117) sends a notification to the host system that the request failed. For example, the notification can comprise a notification that indicates that the specified zone (of the request) has reduced capacity or is offline. Some embodiments use a NVME ZNS Command Set Specification that permits for host command completion to indicate that a requested zone is offline. Additionally, the zone offlining could be from processing of the host request.

Figure 5:
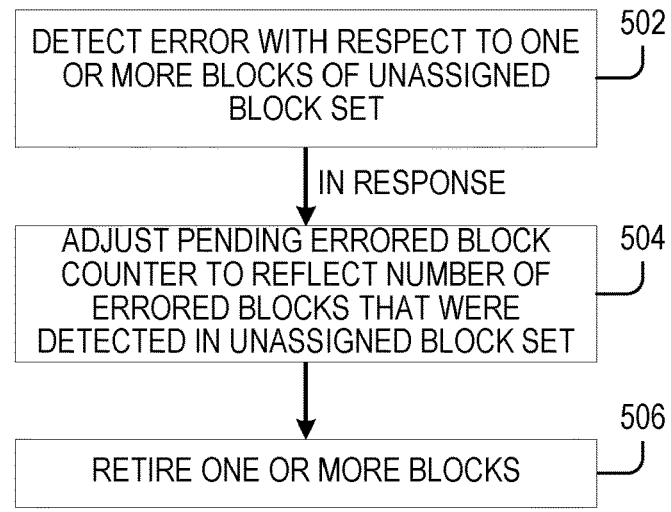

Referring now to the method 500 of FIG. 5, the method 500 illustrates an example method for updating a counter (e.g., an errored block counter) based on detecting one or more errored blocks in a block set. For some embodiments, a zone manager operating on the memory sub-system 110 can perform one or more of the operations of the method 500.

At operation 502, the processing device (e.g., 117) detects an error with respect to one or more blocks of an unassigned block set. Examples of errors detected can include, without limitation, a write error, a read error, and an erase error. For some embodiments, operation 502 comprises the processing device (e.g., 117) detecting that a request has been received from an error handler (e.g., of the memory sub-system 110) to retire one or more blocks or a block set, and the processing device determining that the one or more blocks of the block set specified by the request are currently unassigned (e.g., unbounded). Such a request can be received by a zone manager, such as a zone and block set manager, operating on the memory sub-system 110.

In response to detecting the error with respect to the one or more blocks of the unassigned block set, at operation 504 the processing device (e.g., 117) adjusts an errored block counter to reflect the number of errored blocks that were detected by operation 502. For instance, at operation 504 the processing device (e.g., 117) can increment the errored block counter by the number of errored blocks that were detected by the detecting. During operation 506, the processing device (e.g., 117) retires the one or more errored blocks of the unassigned block set that were detected.

Figure 6:
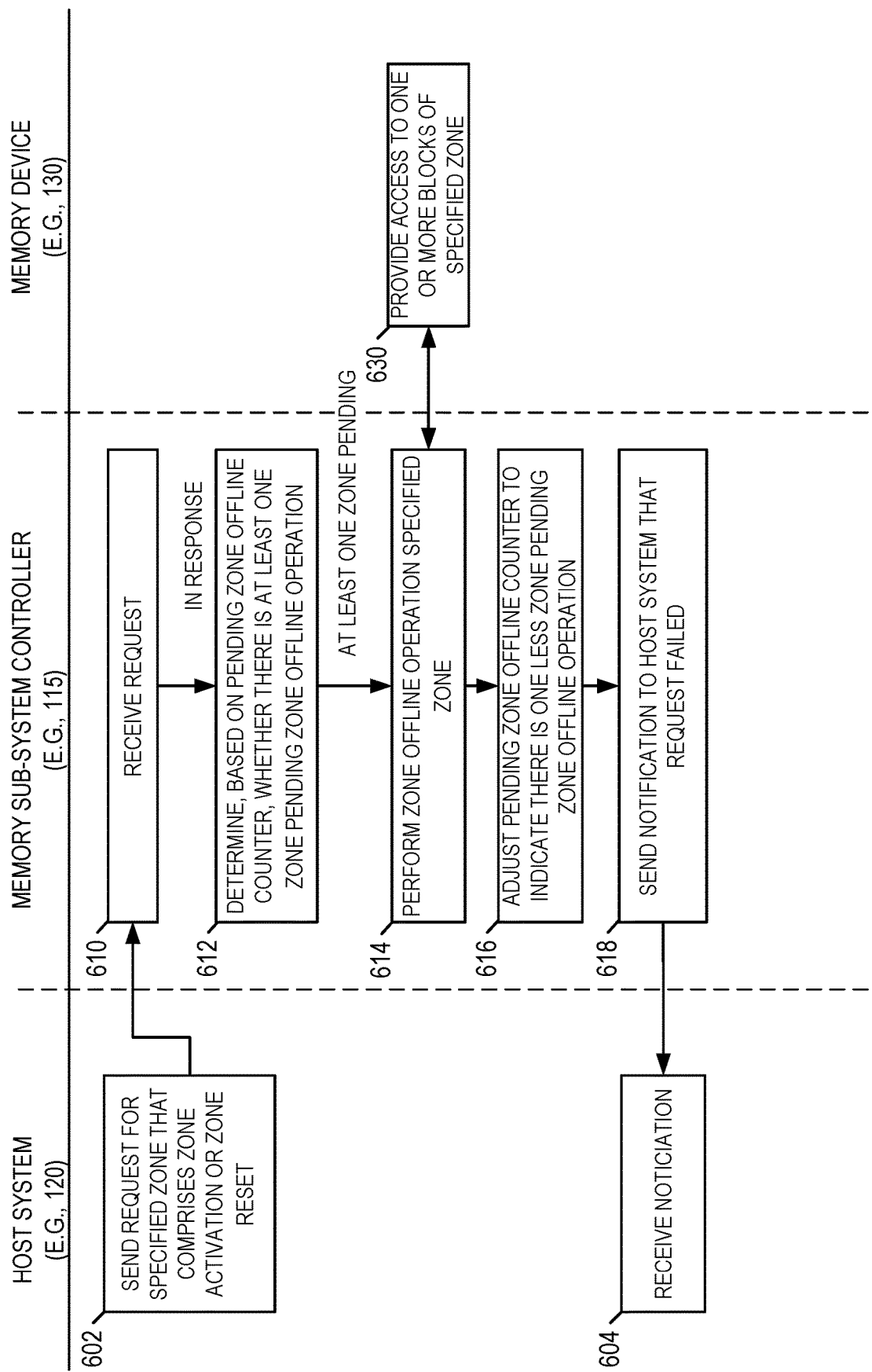
FIG. 6 provides an interaction diagram illustrating interactions between components of a computing environment in the context of some embodiments in which a method for deferring adjustment of a zone in a memory sub-system that supports zones as described herein is performed.

FIG. 6 provides an interaction diagram illustrating interactions between components of a computing environment in the context of some embodiments in which a method for deferring adjustment of a zone in a memory sub-system that supports zones as described herein is performed. The operations of the method can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some embodiments, the method is performed by a host system (e.g., 120), a memory sub-system controller (e.g., 115), a memory device (e.g., 130 or 140), or some combination thereof. Although the operations are shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are used in every embodiment. In the context of the example illustrated in FIG. 6, the host system can include the host system 120, the memory sub-system controller can include the memory sub-system controller 115, and the memory device can include the memory device 130.

As shown in FIG. 6, at operation 602, the host system 120 sends a request for a specified zone, where the request comprises one of a zone activation request or a zone reset request. and, at operation 610, the memory sub-system controller 115 receives the request from the host system 120. Subsequently, at operation 612, the memory sub-system controller 115 determines, based on a pending zone offline counter, whether there is at least one zone pending a zone offline operation. In response to the memory sub-system controller 115 determining at operation 612 that the pending zone offline counter does indicate that there is at least one zone pending the zone offline operation, at operation 614 the memory sub-system controller 115 performs a zone offline operation on the specified zone, which sets the state of the specified zone (e.g., from active) to offline. As part of the zone offline operation, during operation 630, the memory device 130 provides access to one or more blocks (e.g., of a block set) assigned to the specified zone to facilitate the offlining. At operation 616, the memory sub-system controller 115 adjusts the pending zone offline counter to indicate that there is one less zone pending the zone offline operation. Additionally, at operation 618, the memory sub-system controller 115 sends a notification to the host system 120 that the request failed. At operation 604, the host system 120 receives from the memory sub-system 110 the notification that the request failed.

Figure 7:
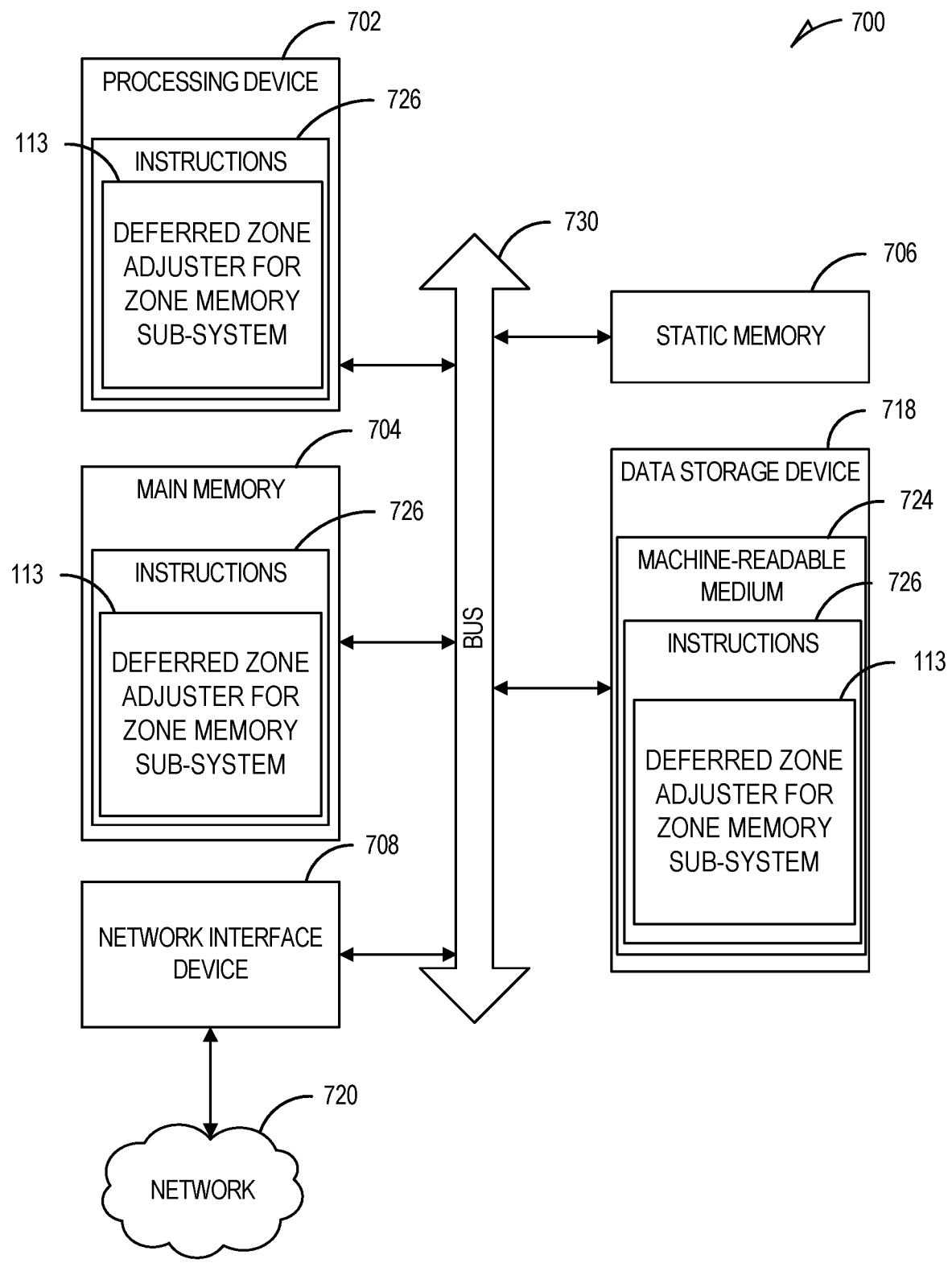
FIG. 7 is a block diagram of an example computer system in which embodiments of the present disclosure may operate.

FIG. 7 illustrates an example machine in the form of a computer system 700 within which a set of instructions can be executed for causing the machine to perform any one or more of the methodologies discussed herein. In some embodiments, the computer system 700 can correspond to a host system (e.g., the host system 120 of FIG. 1) that includes, is coupled to, or utilizes a memory sub-system (e.g., the memory sub-system 110 of FIG. 1) or can be used to perform the operations described herein. In alternative embodiments, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., ROM, flash memory, DRAM such as SDRAM or Rambus DRAM (RDRAM), etc.), a static memory 706 (e.g., flash memory, static random access memory (SRAM), etc.), and a data storage device 718, which communicate with each other via a bus 730.

The processing device 702 represents one or more general-purpose processing devices such as a microprocessor, a central processing unit, or the like. More particularly, the processing device 702 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 702 can also be one or more special-purpose processing devices such as an application-specific integrated circuit (ASIC), a field programmable gate array (FPGA), a digital signal processor (DSP), a network processor, or the like. The processing device 702 is configured to execute instructions 726 for performing the operations and steps discussed herein. The computer system 700 can further include a network interface device 708 to communicate over a network 720.

The data storage device 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 700, the main memory 704 and the processing device 702 also constituting machine-readable storage media. The machine-readable storage medium 724, data storage device 718, and/or main memory 704 can correspond to the memory sub-system 110 of FIG. 1.

In one embodiment, the instructions 726 include instructions to implement functionality corresponding to deferring adjustment of a zone in a zone memory sub-system as described herein (e.g., the deferred zone adjuster 113 of FIG. 1). While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks, ROMs, RAMs, EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a ROM, RAM, magnetic disk storage media, optical storage media, flash memory components, and so forth.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:
1. A system comprising:
a memory device comprising one or more block sets, each block set comprising one or more blocks, each block set being assignable to a zone of the system; and a processing device operatively coupled to the memory device and configured to perform operations comprising:
  receiving, from a host system, a request for a specified zone, the request comprising one of a zone activation request or a zone reset request; and
  in response to the receiving of the request:
    determining, based on a pending zone offline counter, whether there is at least one zone pending a zone offline operation; and
    in response to the pending zone offline counter indicating that there is at least one zone pending the zone offline operation:
      performing the zone offline operation on the specified zone; and
      adjusting the pending zone offline counter to indicate that there is one less zone pending the zone offline operation.

2. The system of claim 1, wherein the adjusting of the pending zone offline counter to indicate that there is one less zone pending the zone offline operation comprises:
  decrementing the pending zone offline counter by a value of one.

3. The system of claim 1, wherein the operations comprise:
  detecting an error with respect to one or more blocks of an unassigned block set; and
  in response to detecting the error with respect to the one or more blocks of the unassigned block set, adjusting the pending zone offline counter to indicate that there is one more zone pending the zone offline operation.

4. The system of claim 3, wherein the adjusting of the pending zone offline counter to indicate that there is one more zone pending the zone offline operation comprises:
  incrementing the pending zone offline counter by a value of one.

5. The system of claim 3, wherein the error is one of a write error, a read error, and an erase error.

6. The system of claim 1, wherein the operations comprise:
  in response to the pending zone offline counter not indicating that there is at least one zone pending the zone offline operation, performing the request on the specified zone.

7. The system of claim 1, wherein the operations comprise:
  in response to the pending zone offline counter indicating that there is at least one zone pending the zone offline operation, sending a notification to the host system that the request failed.

8. At least one non-transitory machine-readable storage medium comprising instructions that, when executed by a processing device, cause the processing device to perform operations comprising:
  receiving, from a host system, a request for a specified zone of a plurality of zones of a memory sub-system, the request comprising one of a zone activation request or a zone reset request, each zone of the plurality of zones being assignable to a block set of the memory sub-system, the block set comprising one or more blocks; and
  in response to the receiving of the request:
    determining, based on an errored block counter, whether at least one zone is pending adjustment; and
    in response to the errored block counter indicating that there is at least one zone pending adjustment:
      adjusting the specified zone based on the errored block counter; and
      adjusting the errored block counter based on the adjusting of the specified zone.

9. The at least one non-transitory machine-readable storage medium of claim 8, wherein the adjusting of the specified zone based on the errored block counter comprises:
  performing a zone offline operation on the specified zone in response to the errored block counter having a value that is larger than or equal to a number of blocks of the specified zone.

10. The at least one non-transitory machine-readable storage medium of claim 9, wherein the adjusting of the errored block counter based on the adjusting of the specified zone comprises:
  adjusting the errored block counter based on the number of blocks of the specified zone.

11. The at least one non-transitory machine-readable storage medium of claim 10, wherein the adjusting of the errored block counter based on the number of blocks of the specified zone comprises:
  decreasing the errored block counter by the number of blocks of the specified zone.

12. The at least one non-transitory machine-readable storage medium of claim 8, wherein the adjusting of the specified zone based on the errored block counter comprises:
  reducing a capacity of the specified zone based on the errored block counter in response to the errored block counter having a value that is less than a number of blocks of the specified zone.

13. The at least one non-transitory machine-readable storage medium of claim 12, wherein the adjusting of the errored block counter based on the adjusting of the specified zone comprises:
  resetting the errored block counter.

14. The at least one non-transitory machine-readable storage medium of claim 8, wherein the operations comprise:
  detecting an error with respect to one or more blocks of an unassigned block set; and
  in response to detecting the error with respect to the one or more blocks of the unassigned block set, adjusting the errored block counter to reflect a number of errored blocks that were detected by the detecting.

15. The at least one non-transitory machine-readable storage medium of claim 14, wherein the adjusting of the errored block counter to indicate the number of errored blocks detected in the unassigned block set comprises:
  incrementing the errored block counter by the number of errored blocks that were detected by the detecting.

16. The at least one non-transitory machine-readable storage medium of claim 14, wherein the error is one of a write error, a read error, and an erase error.

17. The at least one non-transitory machine-readable storage medium of claim 8, wherein the operations comprise:
  in response to the errored block counter not indicating that there is at least one zone pending adjustment, performing the request on the specified zone.

18. The at least one non-transitory machine-readable storage medium of claim 8, wherein the operations comprise:
  in response to the errored block counter indicating that there is at least one zone pending adjustment, sending a notification to the host system that the request failed.

19. A method comprising:
receiving, at a memory sub-system and from a host system, a request for a specified zone of a plurality of zones of the memory sub-system, the request comprising one of a zone activation request or a zone reset request, each zone of the plurality of zones being assignable to a block set of the memory sub-system, the block set comprising one or more blocks; and
in response to the receiving of the request:
  determining, based on a pending zone offline counter, whether there is at least one zone pending a zone offline operation; and
  in response to the pending zone offline counter indicating that there is at least one zone pending the zone offline operation:
    performing the zone offline operation on the specified zone; and
    adjusting the pending zone offline counter to indicate that there is one less zone pending the zone offline operation.

20. The method of claim 19, further comprising:
detecting an error with respect to one or more blocks of an unassigned block set; and
in response to detecting the error with respect to the one or more blocks of the unassigned block set, adjusting the pending zone offline counter to indicate that there is one more zone pending the zone offline operation.

* * * * *